(12) United States Patent
Wilson

(10) Patent No.: US 6,440,534 B1
(45) Date of Patent: Aug. 27, 2002

(54) INTERIOR TRIM COMPONENTS FOR MOTOR VEHICLE

(75) Inventor: Phillip S. Wilson, Commerce Township, MI (US)

(73) Assignee: Magna International of America, Inc., Troy, MI (US)

( * ) Notice: Subject to any disclaimer, the term of this patent is extended or adjusted under 35 U.S.C. 154(b) by 0 days.

(21) Appl. No.: 09/701,019

(22) PCT Filed: May 20, 1999

(86) PCT No.: PCT/US99/11109

§ 371 (c)(1),
(2), (4) Date: Nov. 22, 2000

(87) PCT Pub. No.: WO99/61236

PCT Pub. Date: Dec. 2, 1999

Related U.S. Application Data

(60) Provisional application No. 60/086,596, filed on May 22, 1998.

(51) Int. Cl.⁷ .................................................. B32B 1/00
(52) U.S. Cl. .................... 428/174; 428/293.1; 428/218; 428/219; 428/213; 428/215
(58) Field of Search .................................. 428/218, 174, 428/534, 219, 213, 216, 215, 293.1

(56) References Cited

U.S. PATENT DOCUMENTS

| 4,243,575 A | * | 1/1981 | Myers et al. ......... 260/37 PCS |
| 4,769,274 A | * | 9/1988 | Tellvik et al. ............... 428/218 |
| 5,559,187 A | | 9/1996 | Maeda et al. |

* cited by examiner

*Primary Examiner*—Merrick Dixon
(74) *Attorney, Agent, or Firm*—Pillsbury Winthrop LLP

(57) ABSTRACT

An interior trim component (100) for an automobile comprising a structure formed from at least one polyolefin material and reinforcement particles dispersed within the at least one thermoplastic olefin. The reinforcement particles comprise less than or equal to 10% of a total volume of the rigid structure. At least 40% of the reinforcement particles have a thickness less than about 50 nanometers. The interior trim component (100) is constructed and arranged to be devoid of any decorative coating layer disposed thereon in its final finished form for installation into a vehicle so that the trim component (100) is provided with an unpainted visible surface finish.

10 Claims, 1 Drawing Sheet

INTERIOR TRIM COMPONENTS FOR MOTOR VEHICLE

This application is the national phase of international application PCT/US99/11109 filed May 20, 1999 which designated the U.S.

This application also claims the benefit of U.S. Provisional Application No. 60/086,596, filed May 22, 1998.

FIELD OF THE INVENTION

This invention relates to an interior trim component for a motor vehicle.

BACKGROUND OF THE INVENTION

Hard interior automotive trim such as door panels, instrument panels, steering column covers, glove box doors, knee bolsters, consoles, pillar post covers,'seat backs, speaker grilles, vent grilles, mirror housings, and HVAC housings are often produced by injection molding the more expensive resins, such as ABS or PC/ABS. Hard appearance surface parts are used in many small cars, trucks and sport utility vehicles.

It is desirable to use lower cost polyolefins in these applications. Unfortunately, these materials have relatively soft surfaces, which are prone to scuff, mar and scratch damage. Thus, to maintain the aesthetic appearance of these visible internal components when polyolefin materials are used, the polyolefins must be painted to provide a more durable surface. This adds significant cost and requires surface treatment with an adhesion promoter in order to provide good adhesion between the paint and the polymer. Even then, inconsistent paint adhesion remains a problem.

Summary of the Invention

The disadvantages of the prior art may be overcome by providing an interior trim component for an automobile comprising a structure formed from at least one polyolefin material and reinforcement particles dispersed within the at least one polyolefin material. The reinforcement particles comprise less than or equal to 10% of a total volume of the rigid structure. At least 40% of the reinforcement particles have a thickness less than about 50 nanometers. The interior trim component is constructed and arranged to be devoid of any decorative coating layer disposed thereon in its final finished form for installation into a vehicle so that the trim component is provided with an unpainted visible surface finish.

More preferably, at least 50% of the reinforcement particles have a thickness less that 20 nanometers. In addition it is preferable for at least 99% of the particles to have a thickness of less than 30 nanometers.

Also in accordance with the invention, an interior trim component is preferably loaded with nanoparticles in amounts of 3–5% of the total volume of a polyolefin interior trim part, wherein over 40% of the particles are less than about 50 nanometers in thickness, and thereby enable the part to withstand marring and scuffing (known as the "mar threshold"). It is even more preferred that the interior trim component be loaded with nanoparticles in amounts of 3–7% of the total volume of a polyolefin interior trim part, wherein over 50% of the particles are less than about 20 nanometers in thickness, Thus, the mar threshold of a polyolefin interior trim part can be more than doubled by adding nanoparticles in accordance with the present invention.

DETAILED DESCRIPTION OF THE PREFERRED EMBODIMENTS

Figure 1:
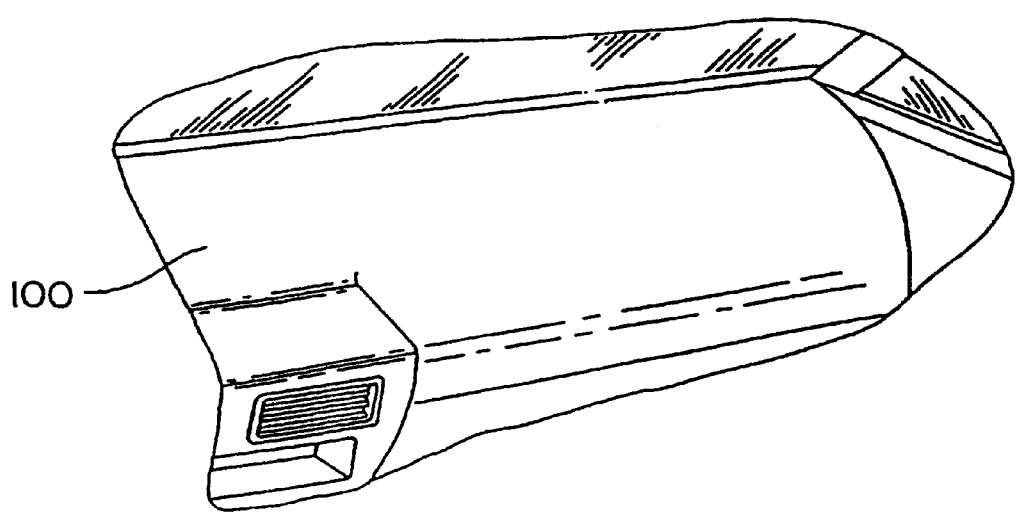
FIG. 1 is a perspective view of an interior trim component in accordance with the present invention, shown installed in a motor vehicle.

In accordance with the present invention, nanoparticle fillers are added in levels of only a few percent by volume. As a result, the resistance of polyolefins to the standard mar and scuff tests can be doubled or even quadrupled. This allows these lower cost materials to be used for the interior trim component, without needing paint to be adequately resistant to scuffing and marring.

The automotive parts manufactured in accordance with the present invention comprises a composite material of a polymer having dispersed therein reinforcement fillers in the form of very small mineral reinforcement particles. The reinforcement filler particles, also referred to as "nanoparticles" due to the magnitude of their dimensions, each comprise one or more generally flat platelets. Generally, each platelet has a thickness of between about 0.7–1.2 nanometers. The average platelet thickness is approximately 1 nanometer thick.

The preferred aspect ratio (which is the largest dimension divided by the thickness) for each particle is about 50 to about 300. At least 80% of the particles should be within this range. If too many particles have an aspect ratio above 300, the material becomes too viscous for forming parts in an effective and efficient manner. If too many particles have an aspect ratio of smaller than 50, the particle reinforcements will not provide the desired reinforcement characteristics. More preferably, the aspect ratio for each particle is between 100–200. Most preferably at least 90% of the particles have an aspect ratio within the 100–200 range.

The platelet particles or nanoparticles are derivable from larger layered mineral particles. Any layered mineral capable of being intercalated may be employed in the present invention. Layered silicate minerals are preferred. The layered silicate minerals that may be employed include natural and artificial minerals. Non-limiting examples of more preferred minerals include montmorillonite. vermiculite, hectorite, saponite, hydrotalcites, kanemite, sodium octosilicate, magadiute, and kenyaite. Mixed Mg and Al hydroxides may also be used. Various other clays can be used, such as claytone H.Y. Among the most preferred minerals is montmorillonite.

To exfoliate the larger mineral particles into their constituent layers, different methods may be employed. For example, swellable layered minerals, such as montmorillonite and saponite are known to intercalate water to expand the inter layer distance of the layered mineral, thereby facilitating exfoliation and dispersion of the layers uniformly in water. Dispersion of layers in water is aided by mixing with high shear. The mineral particles may also be exfoliated by a shearing process in which the mineral particles are impregnated with water, then frozen, and then dried. The freeze dried particles are then mixed into molten polymeric material and subjected to a high sheer mixing operation so as to peel individual platelets from multi-platelet particles and thereby reduce the particle sizes to the desired range.

The composites of the present invention are prepared by combining the platelet mineral with the desired polymer in the desired ratios. The components can be blended by general techniques known to those skilled in the art. For example, the components can be blended and then melted in mixers or extruders.

Additional specific preferred methods, for the purposes of the present invention, for forming a polymer composite having dispersed therein exfoliated layered particles are disclosed in U.S. Pat. Nos. 5,717,000, 5,747,560, 5,698,624, and WO 93/11190. Additional background is included in the following references: U.S. Pat. Nos. 4,739,007 and 5,652,284.

Preferably, the polymer used for the purposes of the present invention is a polyolefin or a blend of polyolefins. The preferred polyolefin is at least one member selected from the group consisting of polypropylene, ethylene-propylene copolymers, thermoplastic olefins (TPOs), and thermoplastic polyolefin elastomers (TPEs).

The exfoliation of layered mineral particles into constituent layers need not be complete in order to achieve the objects of the present invention. The present invention contemplates that at least 40% of the particles should be less than about 50 nanometers in thickness and, thus, at least 40% of the particles should be less than about 50 platelets stacked upon one another in the thickness direction. More preferably, at least 50% of the particles should be less than about 20 nanometers in thickness and, thus, at least 50% of the particles should be less than about 20 platelets stacked upon one another in the thickness direction. It is also preferable for at least 90% of the particles to have a thickness of less than about 5 nanometers. Finally, it is preferable for at least 99% of the particles to have a thickness of less than about 30 nanometers. It is most preferable to have as many particles as possible to be as small as possible, ideally including only a single platelet.

Generally, in accordance with the present invention, each of the interior parts to be manufactured should contain nanoparticle filler in amounts less than 15% by volume of the total volume of the part. The balance of the part is to comprise an appropriate polyolefin material and suitable additives. If greater than 15% by volume of reinforcement filler is used, the viscosity of the composition becomes too high and thus difficult to mold. It more is preferable for the rigid structure forming the interior panel to have reinforcement particles of the type described herein comprise less than 10% of the total volume of the part. It is even more preferable for these relatively rigid parts to have reinforcement particles of the type described herein comprising about 2–10% of the total volume of the part, with the balance comprising the polyolefin substrate. It is most preferable for these exterior panels to have reinforcement particles of the type contemplated herein comprising about 3%–7% of the total volume of the part, wherein over 50% of the particles are less than about 20 nanometers in thickness.

A non-limiting example of an interior trim component in accordance with the present invention can b e a front dash, as generally indicated at 10 in FIG. 1. This trim component is clearly visible to a vehicle occupant and need not be painted in order to retain an aesthetically pleasing appearance over a long period of time.

In accordance with the amount of reinforcement loadings and thicknesses discussed above, it has been found that the flex modulus for the interior trim component can be increased by a factor of about 1.5 to about 4.0 times that of a part produced from the same unreinforced polymer (or thermoplastic). In addition, the coefficient of linear thermal expansion (CLTE) is decreased by a factor of about 1.5 to about 4.0. Improved stiffness and reduced CLTE can be accomplished without loss of impact resistance.

In a test conducted in the automotive industry in order to determine a particular part's resistance to scuffing and marring, it was found that the surface toughness or resistance to marring could be more than doubled by using various nanoparticles in an amount of about 3–5% by volume of the total volume of a polyolefin interior trim part. In one specific example, the test used about 5% by volume claytone H.Y. nanoparticles, wherein over 40% of the particles were less than about 50 nanometers in thickness. The balance of the trim part volume comprised polypropylene plastic and suitable conventional additives.

It should be appreciated that the foregoing description is illustrative in nature and that the present invention includes modifications, changes, and equivalents thereof, without departure from the scope of the invention. Thus, the present invention covers all embodiments and equivalents in accordance with the spirit and scope of the following claims.

What is claimed is:

1. An interior trim component for a motor vehicle, comprising: a structure formed from at least one polyolefin material and reinforcement particles dispersed within the at least one polyolefin material, said reinforcement particles comprising 10% or less of a total volume of the structure, at least 40% of the reinforcement particles having a thickness of about 50 nanometers or less, said structure and hence said interior trim component being devoid of any decorative coating layer disposed thereon in its final finished form for installation into a vehicle so that said trim component comprises an unpainted visible surface finish.

2. An interior trim component according to claim 1, wherein at least 50% of the reinforcement particles have a thickness of about 20 nanometers or less.

3. An interior trim component according to claim 2, wherein at least 90% of the particles have a thickness of about 5 nanometers or less.

4. An interior trim component according to claim 2, wherein at least 99% of the particles have a thickness of about 30 nanometers or less.

5. An interior trim component in accordance with claim 4, wherein said structure is loaded with reinforcement particles in an amount of about 3–7% of the total volume of the structure.

6. An interior trim component according to claim 1, wherein said at least one polyolefin material is selected from a group consisting of polypropylene, ethylene-propylene copolymers, thermoplastic olefins (TPOs), and thermoplastic polyolefin elastomers (TPEs).

7. An interior trim component according to claim 1, wherein at least 80% of said reinforcing particles have an aspect ratio of about 50 to about 300.

8. An interior trim component according to claim 7, wherein at least 90% of said reinforcing particles have an aspect ratio of about 100 to about 200.

9. An interior trim component according to claim 1, wherein said reinforcing particles are formed from at least one material selected from the group consisting of montmorillonite, vermiculite, hectorite, saponite, hydrotalcites, kanemite, sodium octosilicate, magaduite, and kenyaite.

10. An interior trim component for a motor vehicle, comprising a structure formed from at least one polyolefin material and reinforcement particles dispersed within the at least one polyolefin material, said reinforcement particles comprising between about 3–7% of a total volume of the rigid structure, at least 50% of the reinforcement particles having a thickness of about 20 nanometers or less, at least 99% of the reinforcement particles having a thickness of about 30 nanometers or less, wherein at least 80% of said reinforcing particles have an aspect ratio of about 50 to about 300, said interior trim component being devoid of any decorative coating layer disposed thereon in its final finished form for installation into a vehicle so that said trim component comprises an unpainted visible surface finish.

* * * * *

UNITED STATES PATENT AND TRADEMARK OFFICE
CERTIFICATE OF CORRECTION

PATENT NO. : 6,440,534 B1  
DATED : August 27, 2002  
INVENTOR(S) : Wilson

It is certified that error appears in the above-identified patent and that said Letters Patent is hereby corrected as shown below:

<u>Column 1,</u>
Line 3, please add the following immediately following the Title of the Invention:

-- Governmental Support and Interest:

The invention in this patent was made with Governmental support under Cooperative Agreement No. 70NANB7H3028 awarded to the Dow Chemical Company and Decoma International of America, Inc. (formerly Magna International of America, Inc.), project ID 1997-02-0047B, project name "NANOCOMPOSITES - NEW LOW COST/HIGH STRENGTH MATERIALS FOR AUTOMOTIVE PARTS," awarded September 30, 1997 by the United States Department of Commerce, National Institute of Standards and Technology, Advanced Technology Program. The Government has certain rights in this invention. --

Signed and Sealed this

Sixth Day of May, 2003

JAMES E. ROGAN  
*Director of the United States Patent and Trademark Office*